United States Patent
Sarkis et al.

(10) Patent No.: US 12,538,293 B2
(45) Date of Patent: Jan. 27, 2026

(54) SIDELINK RESOURCE SELECTION BASED ON INTER-UE COORDINATION INFORMATION

(71) Applicant: QUALCOMM Incorporated, San Diego, CA (US)

(72) Inventors: Gabi Sarkis, San Diego, CA (US); Seyedkianoush Hosseini, San Diego, CA (US); Tien Viet Nguyen, Bridgewater, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/650,371

(22) Filed: Feb. 8, 2022

(65) Prior Publication Data

US 2022/0361196 A1 Nov. 10, 2022

Related U.S. Application Data

(60) Provisional application No. 63/186,767, filed on May 10, 2021.

(51) Int. Cl.
| | |
|---|---|
| H04W 76/14 | (2018.01) |
| H04W 72/02 | (2009.01) |
| H04W 72/121 | (2023.01) |
| H04W 72/1263 | (2023.01) |
| H04W 72/566 | (2023.01) |
| H04W 92/18 | (2009.01) |

(52) U.S. Cl.
CPC ....... *H04W 72/1263* (2013.01); *H04W 72/02* (2013.01); *H04W 72/121* (2013.01); *H04W 72/569* (2023.01); *H04W 92/18* (2013.01)

(58) Field of Classification Search
CPC .............. H04W 72/02; H04W 72/121; H04W 72/1263; H04W 72/541; H04W 72/542; H04W 72/56; H04W 72/569; H04W 92/18
See application file for complete search history.

(56) References Cited

U.S. PATENT DOCUMENTS

| | | | |
|---|---|---|---|
| 2023/0032706 A1* | 2/2023 | Wu | H04W 72/02 |
| 2024/0088986 A1* | 3/2024 | Ryu | H04L 47/824 |

FOREIGN PATENT DOCUMENTS

| | | | | |
|---|---|---|---|---|
| EP | 4340506 A2 * | 3/2024 | | H04W 28/0278 |
| WO | WO-2022216576 A1 * | 10/2022 | | H04L 5/0037 |

* cited by examiner

*Primary Examiner* — Phuc H Tran
(74) *Attorney, Agent, or Firm* — Procopio, Cory, Hargreaves & Savitch LLP

(57) ABSTRACT

A first user equipment (UE) receives inter-UE coordination information from a second UE. The first UE transmits a sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE. The second UE transmits the inter-UE coordination information for sidelink communication. The second UE may transmit information indicating whether to use at least one of the inter-UE coordination information or sensing for sidelink resource selection.

25 Claims, 13 Drawing Sheets

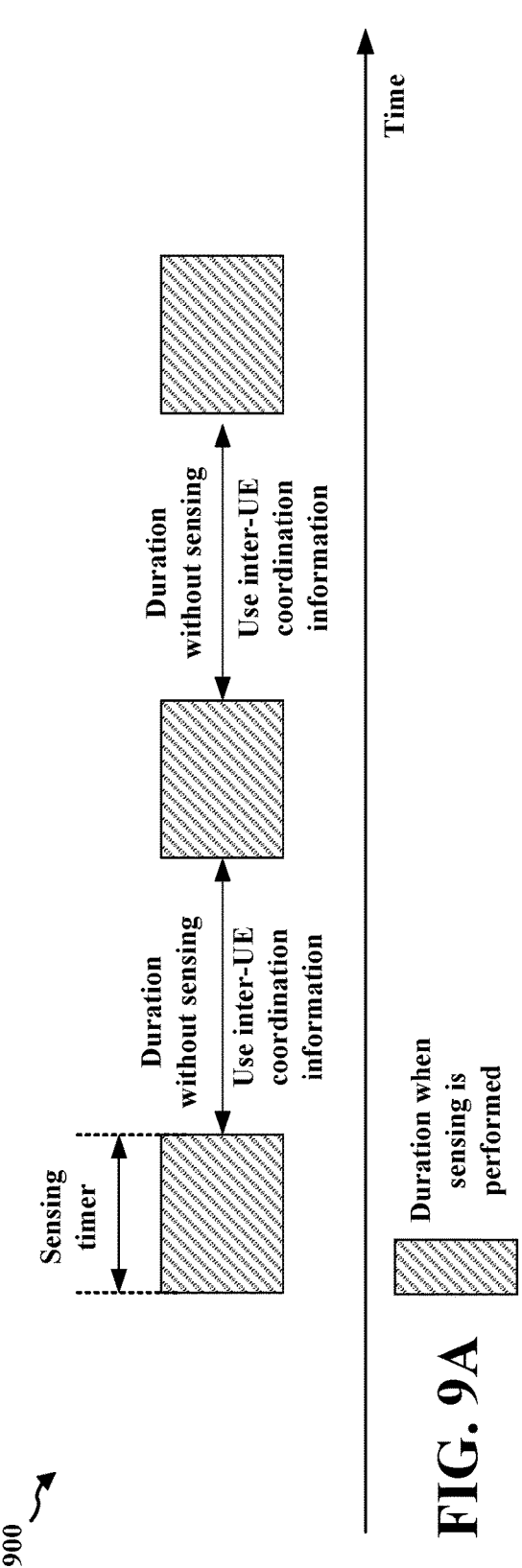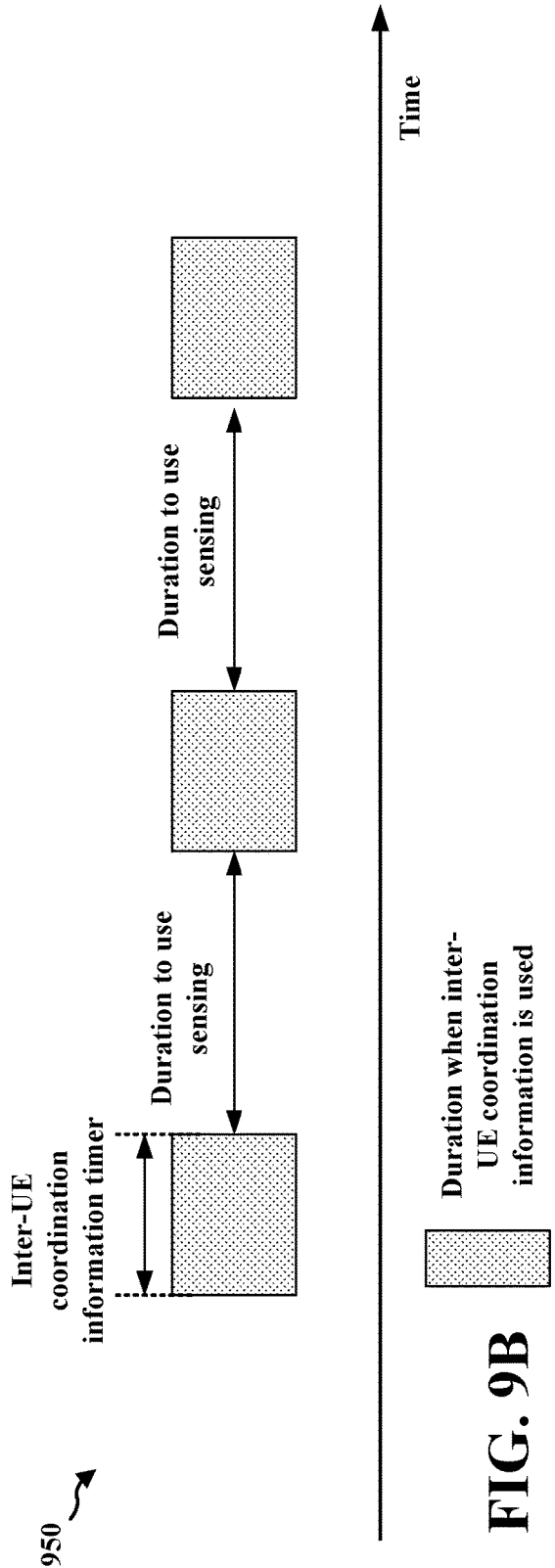
FIG. 9A
FIG. 9B

SIDELINK RESOURCE SELECTION BASED ON INTER-UE COORDINATION INFORMATION

CROSS-REFERENCE TO RELATED APPLICATION(S)

This application claims the benefit of U.S. Provisional Application Ser. No. 63/186,767, entitled "Sidelink Resource Selection Based Inter-UE Coordination Information" and filed on May 10, 2021, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus receives inter-UE coordination information from a second UE. The apparatus transmits a sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE.

In another aspect of the disclosure, a method, a computer-readable medium, and an apparatus are provided for wireless communication at a UE. The transmits the inter-UE coordination information for sidelink communication and transmits information indicating whether to use at least one of the inter-UE coordination information or sensing for sidelink resource selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 9A and 9B are example time diagrams for sidelink resource selection, in accordance with aspects presented herein.

DETAILED DESCRIPTION

Figure 1:
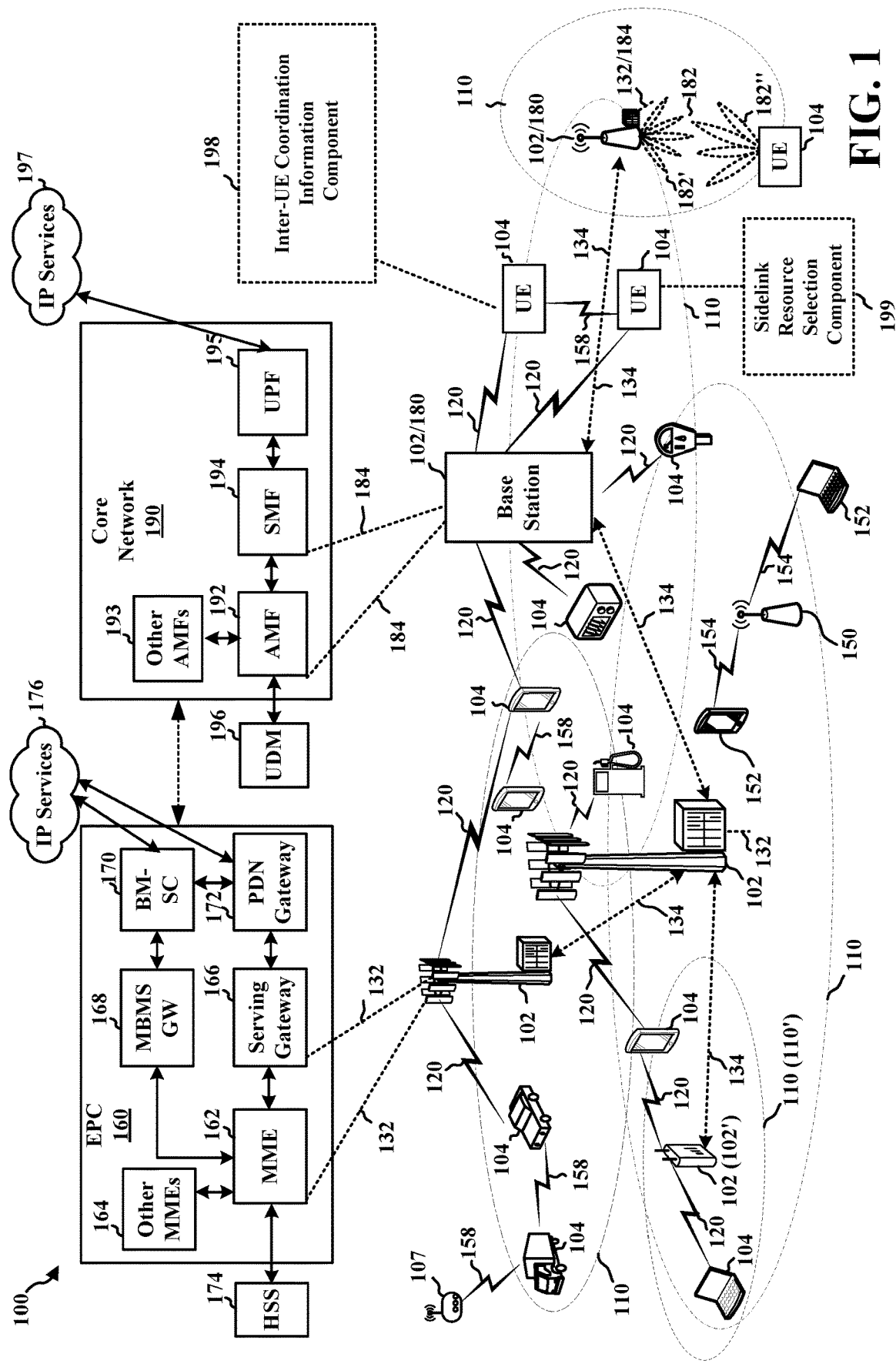
FIG. 1 is a diagram illustrating an example of a wireless communications system and an access network, in accordance with aspects presented herein.

A UE may perform autonomous resource selection for sidelink transmission, which may be referred to as resource allocation mode 2 for sidelink communication. The UE may receive various types of information that may be used for sidelink resource selection. For example, the UE may perform sensing to receive sidelink resource reservations of other UEs. As another example, the UE may receive inter-UE coordination information from other UEs indicating at least one of preferred resources for sidelink transmission by the UE, non-preferred resources for sidelink transmission by the UE, or resource conflict information.

Aspects presented herein enable the UE to determine the type of information, such as sensing information and/or inter-UE coordination information, to use to selection resources for sidelink transmission. The UE may select resources for sidelink transmission using at least one of the types of information based on criteria observed at the UE, such as system congestion, a cast type, a type of inter-UE coordination information, a destination for the transmission, a timer, or a priority level for the transmission for which resources are being selected. The UE may select resources for sidelink transmission using at least one of the types of information based on an indication from the UE that transmitted the inter-UE coordination information. The indication may include an instruction and/or may include a notification that the UE will stop sending inter-UE coordination information.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

In FIG. 1, a UE may receive inter-UE coordination information from another UE. The UE 104 may include a sidelink resource selection component 199 that is configured to transmit a sidelink transmission using resources based on at least one of the inter-UE coordination information or sensing at the first UE, where use of the at least one of the inter-UE coordination information or the sensing is based on one or more of a criteria observed at the first UE or an indication from the second UE. Example aspects of the resource selection and sidelink transmission are described, e.g., in connection with at least FIG. 8 and/or 10. A UE may include an inter-UE coordination information component 198 configured to transmit the inter-UE coordination information for sidelink communication and transmit information indicating whether to use at least one of the inter-UE coordination information or sensing for sidelink resource selection.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g., IP, Ethernet, or unstructured packets, are transferred through the UPF 195. The UPF 195 provides UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Figure 2:
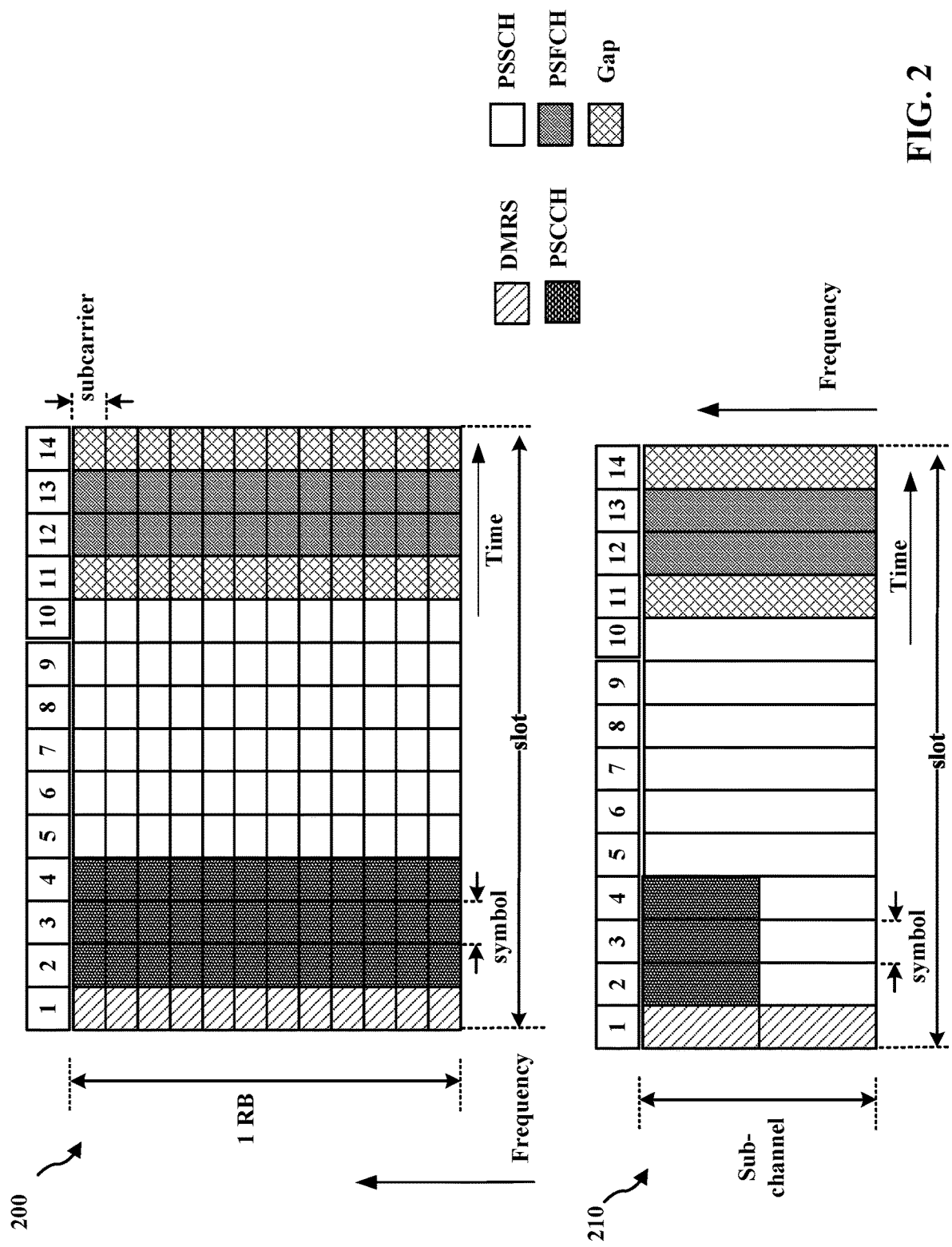
FIG. 2 illustrates example aspects of a sidelink slot structure, in accordance with aspects presented herein.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
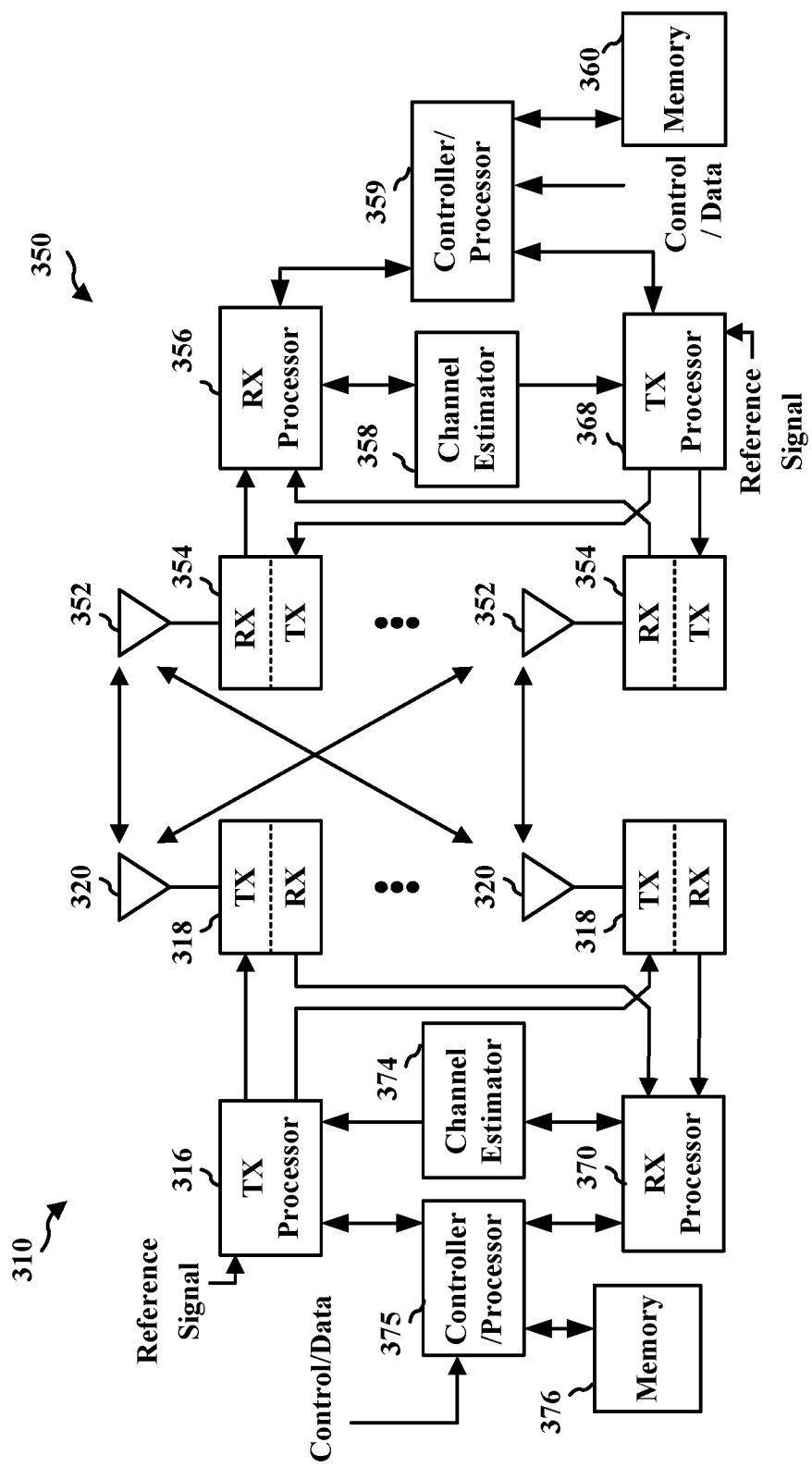
FIG. 3 is a diagram illustrating an example of a first device and a second device involved in wireless communication based, e.g., on sidelink, in accordance with aspects presented herein.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate an RF carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the inter-UE coordination information component 198 of FIG. 1.

At least one of the TX processor 316, the RX processor 370, and the controller/processor 375 may be configured to perform aspects in connection with the sidelink resource selection component 199 of FIG. 1.

Figure 4:
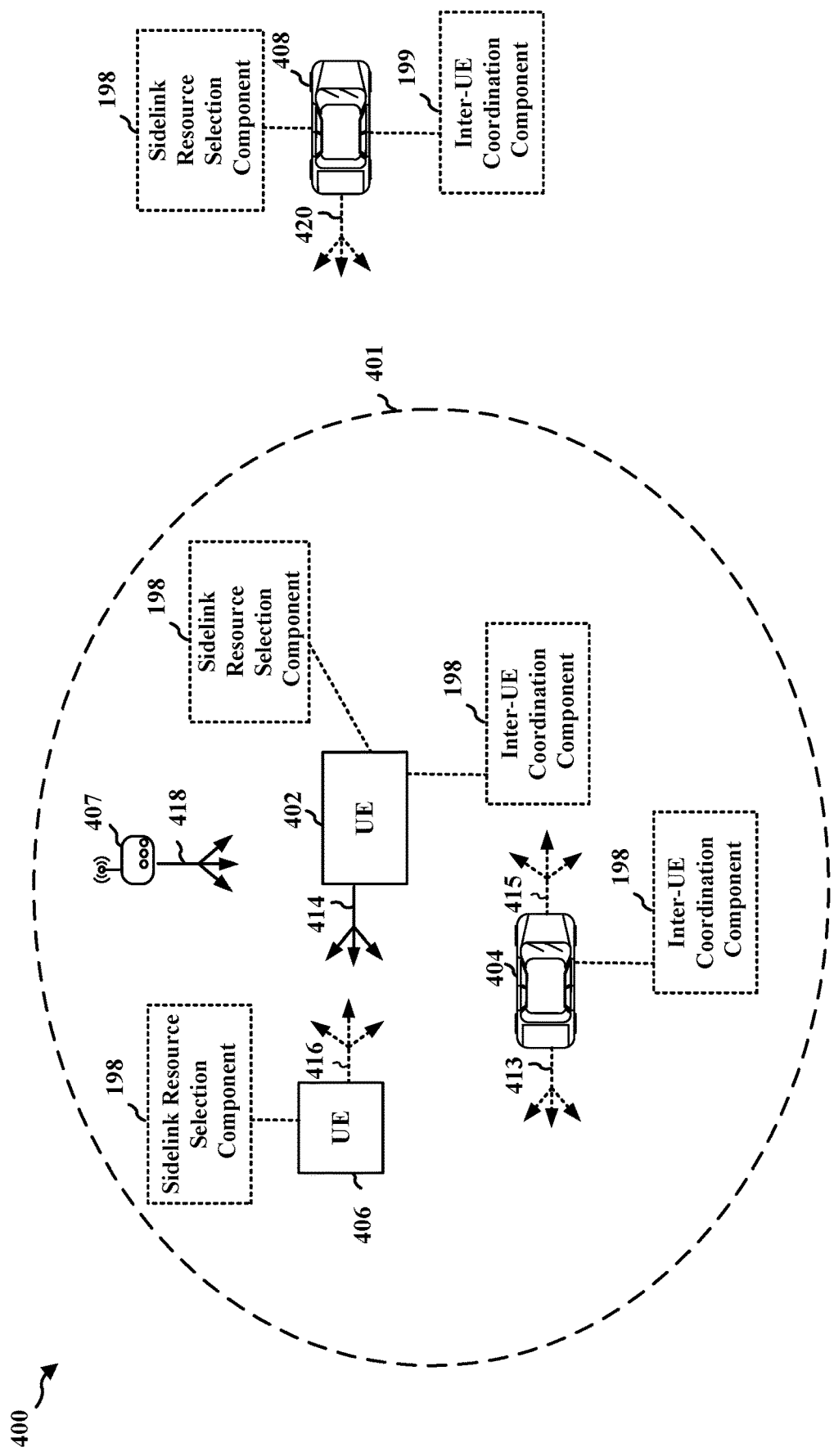
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, the UE 404 may transmit communication, e.g., 413, 415 intended for receipt by other UEs within a range 401 of the UE 404, and the UE 406 may transmit communication, e.g. 416. Additionally, or alternatively, the RSU 407 may receive communication from and/or transmit communication 418 to the UEs 402, 404, 406, or 408. One or more of the UEs 402, 404, 406, 408 or the RSU 407 may comprise a sidelink resource selection component 199 and/or an inter-UE coordination component 198, as described in connection with FIG. 1. As illustrated in FIG. 4, a UE may include one or both of the sidelink resource selection component 199 and the inter-UE coordination information component 198.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
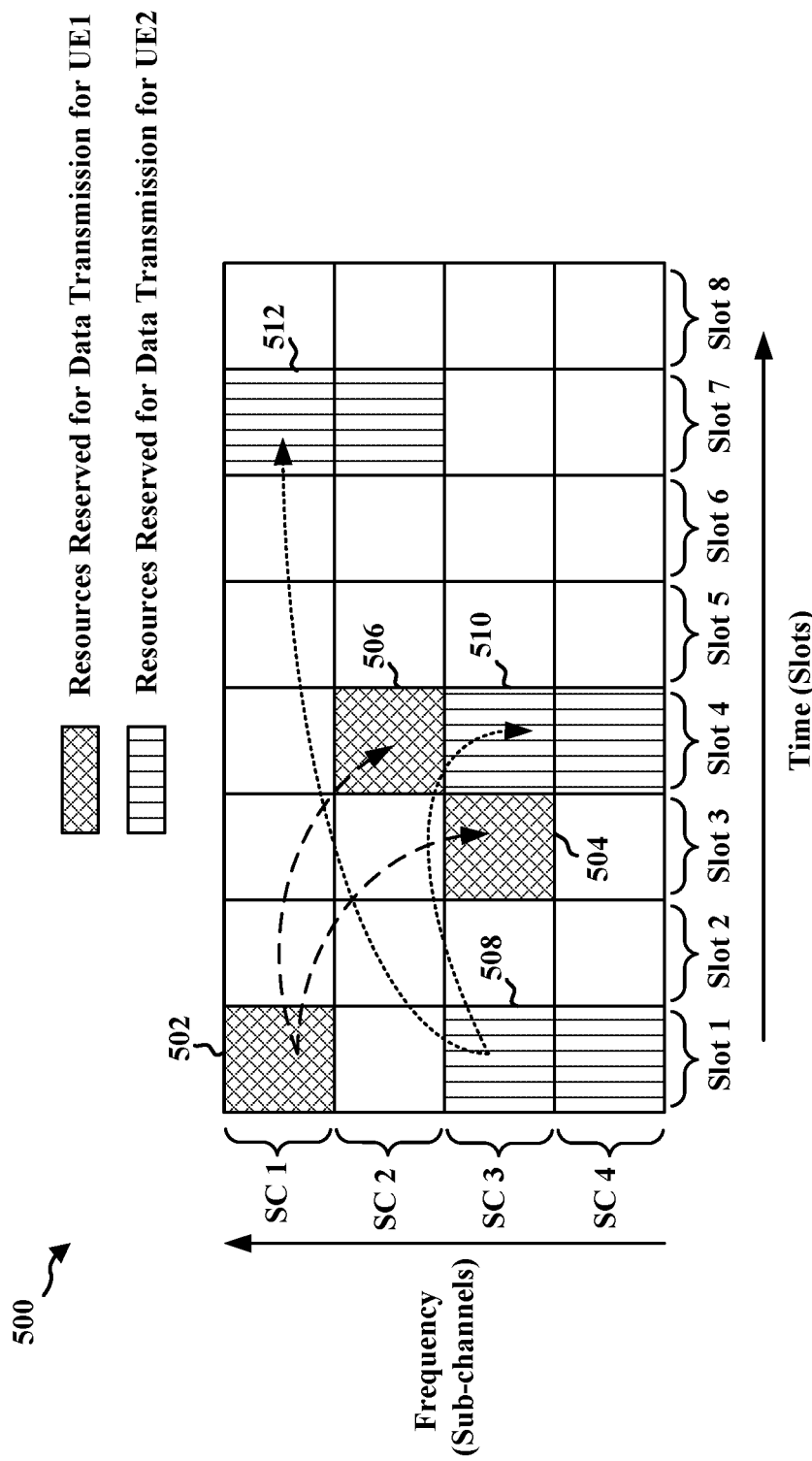
FIG. 5 illustrates examples of resource reservation for sidelink communication, in accordance with aspects presented herein.

FIG. 5 is an example 500 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of time or slots. The initial candidate set of potential resources for a sidelink transmission may include 8 slots by 4 sub-channels, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission, e.g., 510, at time slot 4 using sub-channels SC 3 and SC 4, and reserve second data retransmission, e.g., 512, at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is potentially distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value).

In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions 508, 510, and 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 6:
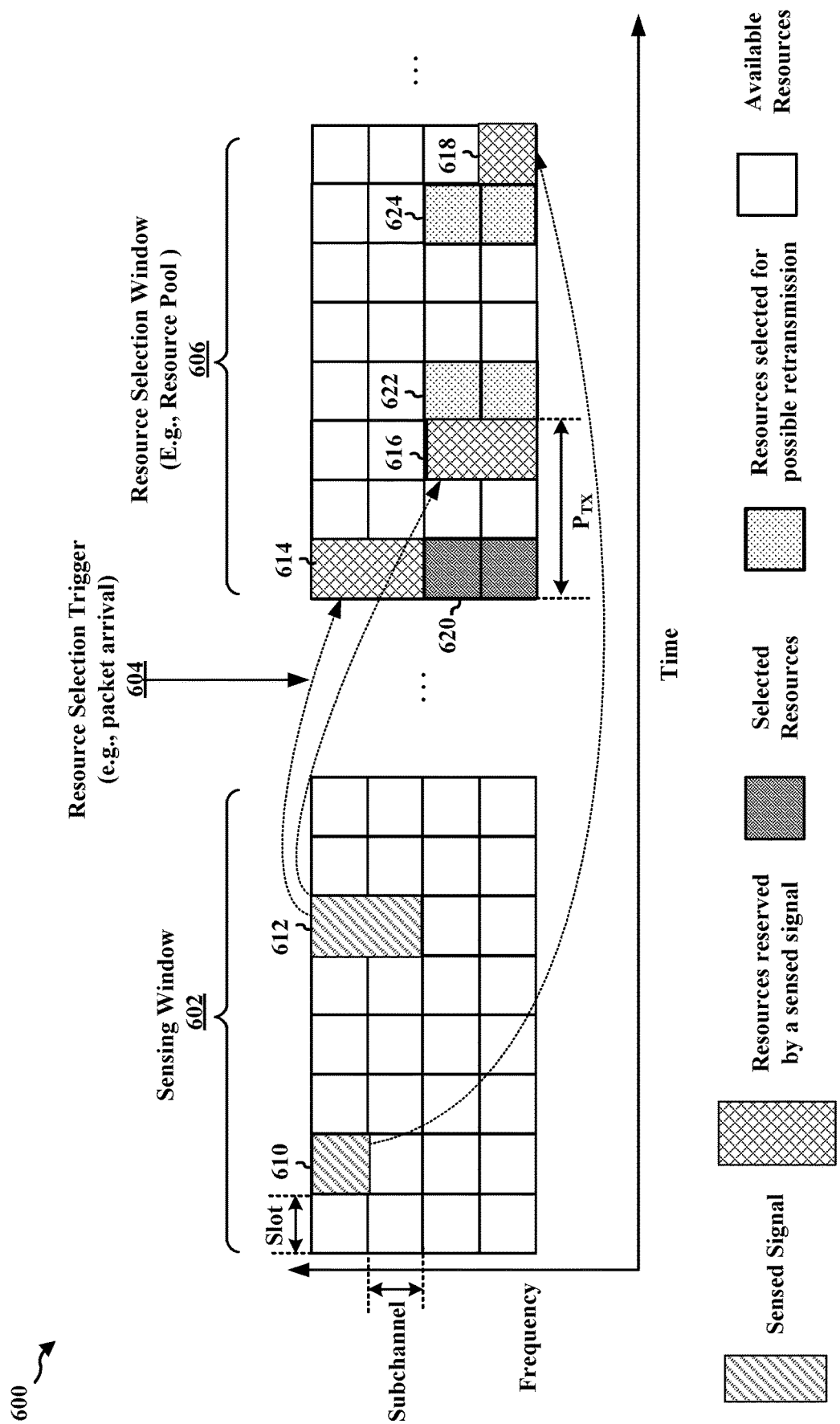
FIG. 6 is an example time diagram for sidelink resource selection, in accordance with aspects presented herein.

FIG. 6 illustrates an example timeline 600 for sidelink resource selection based on sensing. In FIG. 6, the UE may receive sidelink transmission 610 and sidelink transmission 612 during the sensing window 602. FIG. 6 illustrates an example sensing window including 8 consecutive time slots and 4 consecutive sub-channels, which spans 32 resource blocks. The sidelink transmission 610 indicates a resource reservation for resource 618, and sidelink transmission 612 indicates a resource reservation for resources 614 and 622. For example, the sidelink transmissions 610 and 612 may each include SCI that indicates the corresponding resource reservation. Resource reservations may be periodic or aperiodic. Different reservations of resources may have different priority levels, e.g., with the priority level indicated in the SCI.

A UE receiving the transmissions 610 and 612 may exclude the resources 614, 616, and 618 as candidate resources in a candidate resource set based on the resource selection window 606. In some examples, the sidelink device may exclude the resources 614, 616, or 618 based on whether a measured RSRP for the received SCI (e.g., in 610 or 612) meets a threshold. When a resource selection trigger occurs at 604, such as the sidelink device having a packet for sidelink transmission, the sidelink device may select resources for the sidelink transmission (e.g., including PSCCH and/or PSSCH) from the remaining resources of the resource pool within the resource selection window 606 after the exclusion of the reserved resources (e.g., 614, 616, and 618). FIG. 6 illustrates an example in which the sidelink device selects the resource 620 for sidelink transmission. The sidelink device may also select resources 622 and/or 624 for a possible retransmission. After selecting the resources for transmission, the sidelink device may transmit SCI indicating a reservation of the selected resources. Thus, each sidelink device may use the sensing/reservation procedure to select resources for sidelink transmissions from the available candidate resources that have not been reserved by other sidelink devices In some instances, multiple UEs may transmit at the same time and may not receive the overlapping communication (e.g., SCI indicating resource reservations) from each other and/or from a base station. Such a UE may miss or be unaware of transmissions and sidelink reservations by other UEs. Therefore, two UEs may reserve the same resource block for a future sidelink transmission, which may result in a resource collision. A resource collision occurs for sidelink transmissions that overlap at least partially in time, and which may overlap, at least partially, in frequency.

Figure 7:
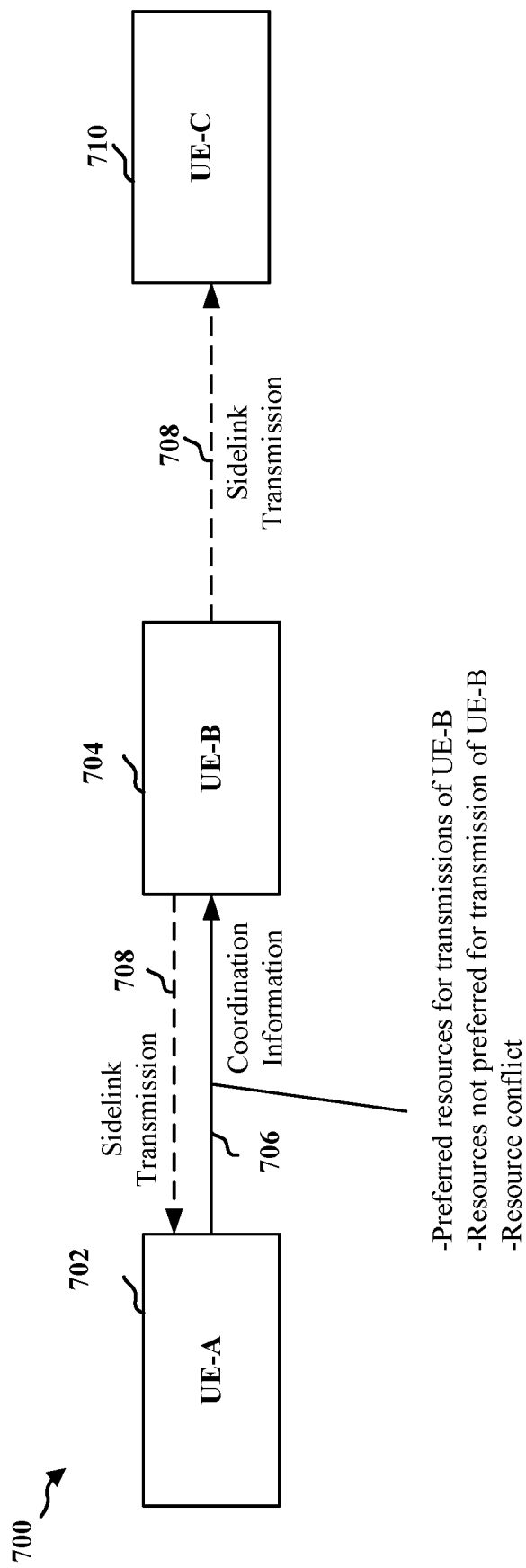
FIG. 7 illustrates an example of inter-UE coordination for sidelink communication, in accordance with aspects presented herein.

To reduce or avoid resource collisions under such instances, and to improve sidelink communication among UEs, the UEs may coordinate among themselves by generating and sharing inter-UE coordination information with other UEs. FIG. 7 is a diagram 700 illustrating the exchange of inter-UE coordination information, where a first UE ("UE-A") 702 transmits inter-UE coordination information 706 to a second UE ("UE-B") 704.

The inter-UE coordination information 706 may include information based on the UE's sensing information (e.g., resource reservations of other UEs that are sensed by UE 702 (e.g., UE-A)), inter-UE coordination information from another UE, resources that are bad, undesirable, or non-preferred for the UE-A 702 (e.g., resources subject to high interference), resources which are preferred or better than other resources for the UE-A 702, etc. The inter-UE coordination information 706 may indicate candidate resources for sidelink transmission or preferred resources for transmissions by UE-B 704. The UE-A 702 may use the inter-UE coordination information 706 to inform the UE-B 704 about which sub-channels and slots may be used for communicating with the UE-A 702 and/or which sub-channels and slots may not be used because they are occupied or reserved by the UE-A 702 and/or other UEs. The candidate resources may indicate a group of resources from which the UE-B 704 (e.g., UE-B) may select for the sidelink transmission 708. As illustrated, the sidelink transmission 708 may be for UE-A 702 or for one or more different UEs, e.g., UE-C 710. In some aspects, the inter-UE coordination information 706 may indicate resources for a sidelink transmission, e.g., particular resources on which the UE-B 704 is to transmit the sidelink transmission 708 rather than candidate resources that the UE-B 704 may select. In some aspects, the inter-UE coordination information 706 may indicate a half-duplex conflict. For example, the inter-UE coordination information 706 may indicate a collision in time and/or frequency for two transmitting UEs that are unable to receive the other, respective transmission in a half-duplex mode. In some aspects, the inter-UE coordination information 706 may indicate a collision of resources (e.g., reserved resources) in time and/or frequency.

Based at least in part on the inter-UE coordination information 706 from the UE-A 702, the UE-B 704 may make a better decision on which resources to use and/or reserve for its sidelink transmission 708 to avoid resource collisions. The UE-A 702 may share its inter-UE coordination information 706 with multiple UEs, and the UE-B 704 may receive the inter-UE coordination information 706 from multiple UEs. Inter-UE coordination information 706 may be transmitted in any of various ways.

The UE-A 702 may transmit inter-UE coordination information 706 in a PSFCH, e.g., indicating a resource collision or a half-duplex conflict indication. The UE-A 702 may transmit inter-UE coordination information 706 in SCI. For example, the UE-A 702 may transmit shared sensing information, candidate resource information for a sidelink transmission, or particular resources for a sidelink transmission in SCI-2 transmitted in PSSCH. For example, a first portion of SCI (e.g., SCI-1) may be transmitted in PSCCH, and a second portion of SCI (e.g., SCI-2) may be transmitted in PSSCH. The UE-A 702 may transmit inter-UE coordination information 706 in a MAC-CE, e.g., on the PSSCH. The UE-A 702 may transmit the inter-UE coordination information 706 in a new physical channel (e.g., that is different than PSCCH, PSSCH, PSFCH, etc.). For example, the UE-A 702 may transmit the inter-UE coordination information 706 in a physical channel that is configured for or dedicated to inter-UE configuration information. The UE-A 702 may transmit the inter-UE coordination information 706 in RRC signaling.

In some aspects, the UE-A 702 may transmit the inter-UE coordination information 706 periodically. In some aspects, the UE-A 702 may transmit aperiodic inter-UE coordination information 706 in response to a trigger. Among other examples, the trigger may be based on the occurrence of an event, such as the occurrence of/detection of a resource collision, the occurrence of/detection of a half-duplex conflict, etc. For example, if the UE-A 702 detects a resource collision, the UE-A 702 may respond by transmitting inter-UE coordination information 706.

In a first scheme, the coordination information 706 sent from UE-A 702 to UE-B 704 is the set of resources preferred and/or non-preferred for UE-B's transmission 708. In some aspects. In some aspects, the inter-UE coordination information 706 may include additional information other than indicating time/frequency of the resources within the set in the coordination information.

In a second scheme, the inter-UE coordination information 706 from UE-A 702 to UE-B 704 indicates the presence of an expected/potential and/or detected resource conflict on the resources indicated by an SCI from UE-B 704.

The UE-B 704 may utilize the inter-UE coordination information 706 in various ways.

If the inter-UE coordination information 706 includes information based on the first scheme (e.g., resources that are preferred for transmissions of the UE-B 704 and/or resources that are not preferred for transmissions of the UE-B 704), the UE-B 704 may select resource(s) to be used for its sidelink transmission resource selection, or resource re-selection, may be based on both UE-B's sensing result (if available) and the received inter-UE coordination information 706 according to a first option. In a second option, the UE-B 704 may select resource(s) to be used for its sidelink transmission resource selection, or resource re-selection, may be based on the received inter-UE coordination information 706 and not based on sensing. In a third option, the UE-B 704 may select resource(s) to be used for its sidelink transmission resource selection, or resource re-selection, may be based on the received inter-UE coordination information 706 (which may allow the UE-B to use or not use sensing in combination with the inter-UE coordination information 706)

If the inter-UE coordination information 706 includes information based on the second scheme (e.g., information indicating a resource conflict), the UE-B 704 may determine resources to be re-selected based on the received inter-UE coordination information 706. The UE-B 704 may determine whether to perform a retransmission based on the received inter-UE coordination information 706. In some aspects, the UE-B 704 may use sensing information in combination with the inter-UE coordination information 706 to determine resources to be re-selected and/or to determine whether to perform a retransmission.

Figure 8:
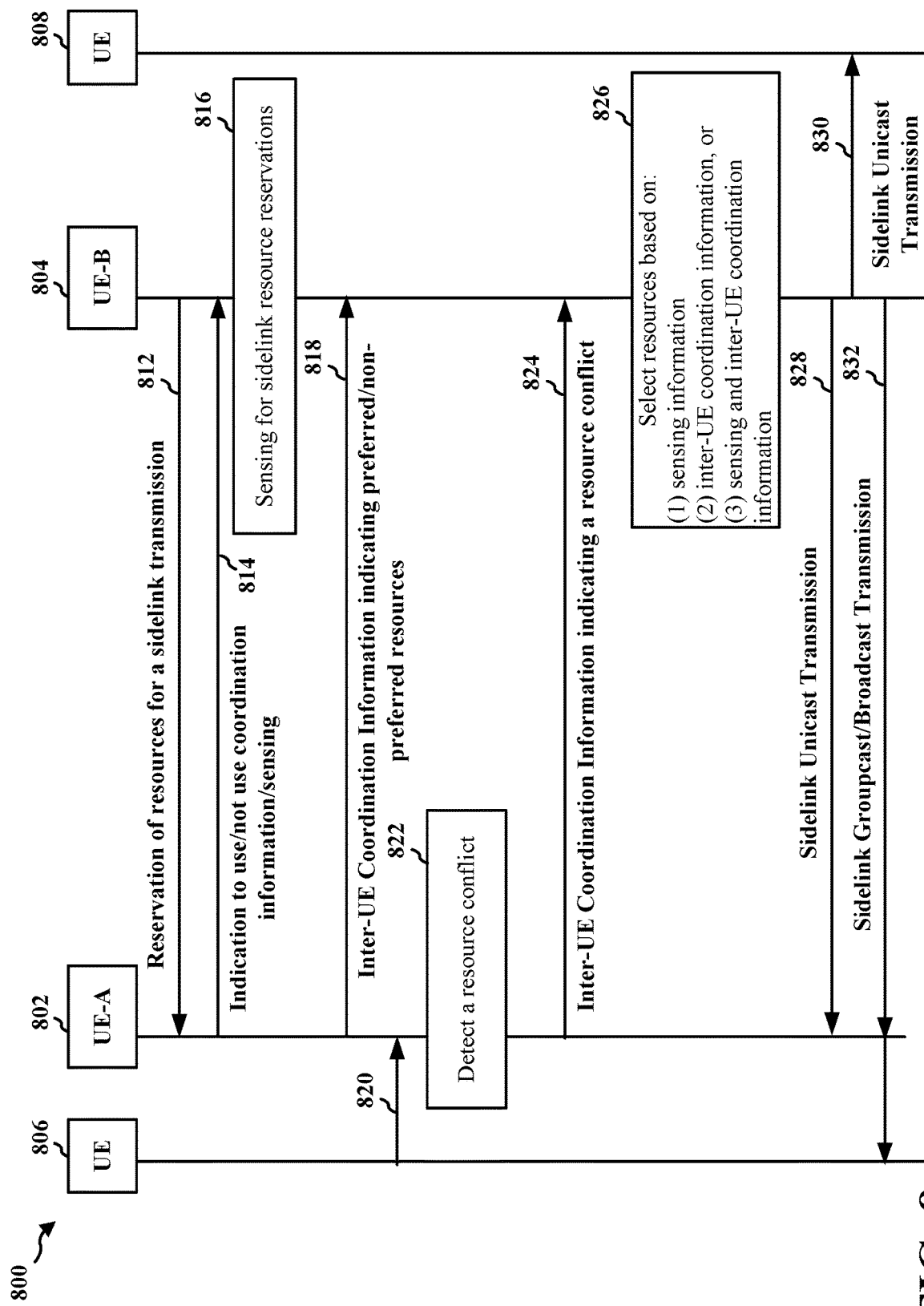
FIG. 8 is a communication flow between UEs that includes the exchange of inter-UE coordination information, in accordance with aspects presented herein.

Aspects presented herein provide mechanisms for the UE-B 704 to determine how and/or when to apply such inter-UE coordination information 706 and/or sensing information. FIG. 8 illustrates an example communication flow 800 including the exchange of inter-UE coordination information for sidelink communication. The UE-A 802 may correspond to the UE-A 702 in FIG. 7, and the UE-B 804 may correspond to the UE-B in FIG. 7. As illustrated at 818 or 824, the UE-A 802 may transmit inter-UE coordination information to the UE-B. The inter-UE coordination information 818 may include a set of one or more preferred resources for the UE-B to use for sidelink transmission or a set of one or more non-preferred resources, such as described in connection with scheme 1 above. The inter-UE coordination information 824 may include information about a resource conflict for the UE-B 804. For example, the UE-B 804 may transmit SCI indicating a sidelink resource reservation, at 812. The UE-A 802 may receive the resource reservation 812 and may also receive a different sidelink resource reservation 820 from another UE 806. One, both, or neither of the sidelink resource reservations 812 or 820 may be for a sidelink transmission directed to the UE-A. At, 822, the UE-A may detect a conflict between the sidelink resource reservations 812 and 820, e.g., an overlap in time and/or frequency. The UE-A may report the conflict to the UE-A in the inter-UE coordination information 824.

In addition to receiving the inter-UE coordination information 818 or 824, the UE-B 804 may also perform sensing at 816, which may include any of the aspects described in connection with FIG. 5 and/or 6.

At 826, the UE-B 804 selects resources for sidelink transmission, or for a sidelink re-transmission, based on at least one of the sensing, at 816, or the inter-UE coordination information received at 818 or 824. The UE-B 804 may determine whether to use sensing information without the inter-UE coordination information, to use inter-UE coordination information without the sensing information, or to use both the sensing information and the inter-UE coordination information.

In some aspects, the UE-B 804 may determine the type of information to use for sidelink resource selection based on system congestion. System congestion may be measured using a channel busy ratio (CBR), which indicates a ratio or percentage of the available wireless resources that are used for wireless transmissions. If the system is congested, such as with the CBR being above a threshold, the UE-B 804 may use sensing and inter-UE coordination information to select resources and/or to reselect resources for sidelink transmission. If the system is more lightly loaded, with the CBR below the threshold, the UE-B 804 may user inter-UE coordination information without the sensing information. As another example, the UE-B 804 may select the resources based on the sensing and the inter-UE coordination information if the CBR is above a threshold level and may transmit the sidelink transmission using the sensing and not the inter-UE coordination information if the CBR is below the threshold. As another example, the UE-B 804 may transmit the sidelink transmission using the resources based on the inter-UE coordination information if the CBR is above a threshold level and transmit the sidelink transmission using the sensing and the inter-UE coordination information if the CBR is below the threshold.

In some aspects, the UE-B 804 may determine the type of information to use for sidelink resource selection based on system the cast type (e.g., unicast, groupcast, or broadcast) of the UE's sidelink transmission for which the resources are being selected and/or based on the destination for the sidelink transmission. As an example, the UE-B 804 may use the inter-UE coordination information 818 or 824 when transmitting a unicast transmission 828 to the UE-A 802. If the transmission is a broadcast transmission, such as transmission 832, the UE-B 804 may use sensing information and not the inter-UE coordination information 818 or 824. The UE-B 804 may transmit the sidelink transmission using the resources based on the sensing and the inter-UE coordination information if the sidelink transmission is a groupcast transmission, such as a groupcast, e.g., 832, to a group that includes the UE-A. The UE-B 804 may transmit the sidelink transmission using the resources based on the inter-UE coordination information and not the sensing if the sidelink transmission is a groupcast transmission, e.g., based on groupcast feedback such as ACK/NACK.

In some aspects, the UE-B 804 may determine the type of information to use for sidelink resource selection based on the cast type of the sidelink transmission and/or the type of the inter-UE coordination information. For example, the UE-B 804 may transmit the sidelink transmission using the resources based on the inter-UE coordination information if the sidelink transmission is a unicast transmission 828 to the UE-A 802 and the inter-UE coordination information 818 indicates preferred resource information for the UE-B 804. The UE-B 804 may transmit the sidelink transmission using the resources based on the inter-UE coordination information 818 if the sidelink transmission is a is not a unicast transmission to the second UE, such as a broadcast, a groupcast, or a unicast 830 to a different UE 808, and the inter-UE coordination information indicates non-preferred resource information for the UE-B 804.

In some aspects, the UE-B 804 may determine the type of information to use for sidelink resource selection based on the inter-UE coordination information 818 or 824 that is received. For example, the UE-B 804 may transmit the sidelink transmission using the resources based on the sensing if the inter-UE coordination information indicates one or more conflicts, e.g., at 824. The UE-B 804 may transmit the sidelink transmission using the resources based on the sensing if the inter-UE coordination information indicates a threshold number conflicts. The threshold number of conflicts may be configured. The threshold number of conflicts may be specific to a particular resource pool. The threshold number of conflicts may be based on a rule or may be specified, such as in a wireless technology standard.

In some aspects, the UE-B 804 may determine the type of information to use for sidelink resource selection based on a timer. For example, the UE-B may transmit the sidelink transmission using the resources based on the sensing during a period of time associated with the timer. The UE may transmit the sidelink transmission using the resources based on the inter-UE coordination information during a period of time associated with the timer. FIG. 9A illustrates an example time diagram 900 showing that the UE may use perform sensing and use sensing information for sidelink resource selection during particular periods of time and may skip sensing during other periods of time. FIG. 9B illustrates an example time diagram 950 showing that the UE may use inter-UE coordination information during particular times and may use sensing information during other periods of time. In some aspects, by skipping the sensing procedure at times, the UE-B may save power. The periodic, or aperiodic, use of sensing information may help the UE to avoid conflicts.

In some aspects, the UE-B 804 may determine the type of information to use for sidelink resource selection based on a priority of the sidelink transmission for which the resources are being selected. For example, the UE-B 804 may use sensing information for lower priority transmission and may use inter-UE coordination information (with or without the sensing information) for higher priority transmissions.

Alternative to, or in addition to, the criteria that is observable at the UE-B, the UE-B may determine whether to select sidelink transmission resources based on inter-UE coordination information and/or sensing information based on an indication from the UE-A. For example, the UE-A 802 may transmit an indication 814, or other indication, to the UE-B indicating for the UE-B 804 to use sensing information, inter-UE coordination information, or both to select transmission resources. The UE-B 804 may select the transmission resources, at 826, based on the indication 814 from the UE-A 802. The indication 814 may be in SCI-1, SCI-2, a MAC-CE, a PC5-RRC message, or in an inter-UE coordination message itself. As an example, one or more bits of the inter-UE coordination information 818 or 824 may indicate to the UE-B whether to use sensing information, inter-UE coordination information, or both to select transmission resources.

In some aspects, the indication 814 may be an advance indication that the UE-A will stop providing the UE-B with inter-UE coordination information. The advance notification may enable the UE-B to start collecting sensing information in order to be ready to perform sidelink resource selection in a different manner when the UE-A 802 stops sending the inter-UE coordination information. The indication 814 may indicate a period of time until the UE-A stops sending the inter-UE coordination information. In some aspects, the period of time following the indication 814 may be a set period of time.

Figure 10:
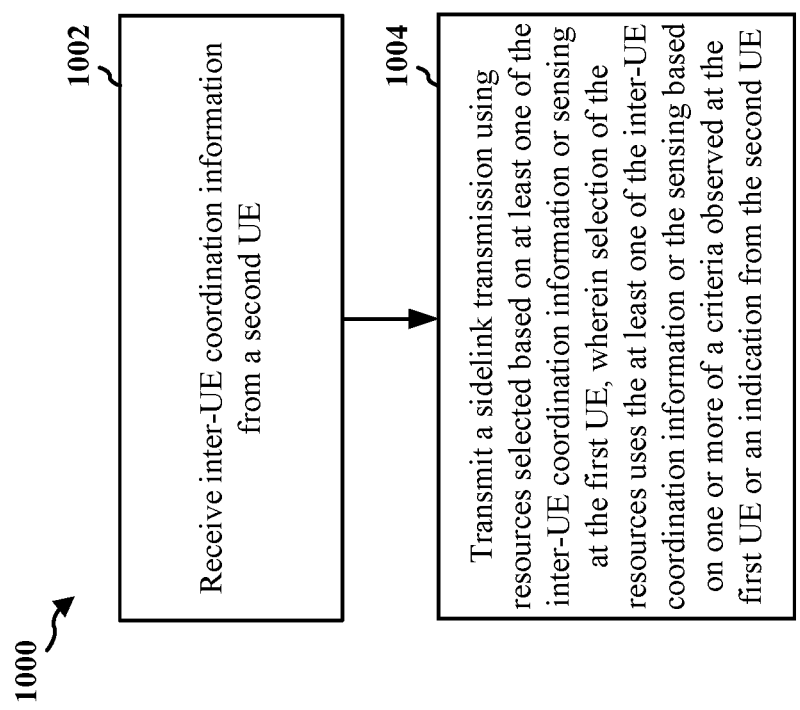
FIG. 10 is a flowchart of a method of wireless communication, in accordance with aspects presented herein.

FIG. 10 is a flowchart 1000 of a method of wireless communication. The method may be performed by a UE (e.g., the UE 104, the UE-B 704 or 804; or the apparatus 1102). The method may enable the UE to utilize inter-UE coordination information and/or sensing information for sidelink resource selection.

At 1002, the UE receives inter-UE coordination information from a second UE. The first UE may receive the indication in a sidelink control information-1 (SCI-1), SCI-2, a medium access control-control element (MAC-CE), or sidelink radio resource control (RRC) message, or an inter-UE coordination information message. Example aspects of inter-UE coordination information are described in connection with FIG. 7. FIG. 8 illustrates examples of inter-UE coordination information 818 and 824. The reception of the inter-UE coordination information may be performed by the inter-UE coordination information component 1140 of the apparatus 1102, e.g., via the reception component 1130 and/or the transceiver 1122.

At 1004, the UE transmits a sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE. The selection of the sidelink resources may be performed by the resource selection component 1142 of the apparatus 1102, and the transmission may be performed by the transmission component 1134 of the apparatus 1102 via the transceiver 1122.

The UE may use the resources selected based on the at least one of the inter-UE coordination information or the sensing based on the criteria observed at the first UE, such as described in connection with any of the aspects in FIG. 8.

The criteria observed at the first UE may include a CBR. The UE may transmit the sidelink transmission using the resources selected based on the sensing and the inter-UE coordination information if the CBR is above a threshold level and may transmit the sidelink transmission using the resources selected based on the inter-UE coordination information and not the sensing if the CBR is below the threshold level. The UE may transmit the sidelink transmission using the resources selected based on the sensing and the inter-UE coordination information if the CBR is above a threshold level and may transmit the sidelink transmission using the sensing and not the inter-UE coordination information if the CBR is below the threshold level. The UE may transmit the sidelink transmission using the resources selected based on the inter-UE coordination information if the CBR is above a threshold level and may transmit the sidelink transmission using the resources selected based on the sensing and the inter-UE coordination information if the CBR is below the threshold level.

The criteria observed at the first UE may include at least one of a cast type, a feedback option, or a destination for the sidelink transmission. The UE may transmit the sidelink transmission using the resources selected based on the inter-UE coordination information and not the sensing if the sidelink transmission is a unicast transmission to the second UE. The UE may transmit the sidelink transmission using the resources selected based on the sensing and not the inter-UE coordination information if the sidelink transmission is a broadcast transmission. The UE may transmit the sidelink transmission using the resources selected based on the sensing and the inter-UE coordination information if the sidelink transmission is a groupcast transmission. The UE may transmit the sidelink transmission using the resources selected based on the inter-UE coordination information and not the sensing if the sidelink transmission is a groupcast transmission. There may be feedback options for a groupcast. A first feedback type may be NACK-only feedback, where a receiver transmits a NACK if the sidelink message is not received and does not transmit feedback (e.g., an ACK) if the sidelink message is successfully received. A second feedback type may include ACK/NACK feedback in which the receiver transmits an ACK if the sidelink message is successfully received and transmits a NACK if the sidelink message is not successfully received. The UE may transmit the sidelink transmission using the resources selected based on the sensing and the inter-UE coordination information if the sidelink transmission is a groupcast transmission having NACK-only feedback. The UE may transmit the sidelink transmission using the resources selected based on the inter-UE coordination information if the sidelink transmission is a groupcast transmission having NACK-only feedback. The UE may transmit the sidelink transmission using the resources selected based on the sensing information if the sidelink transmission is a groupcast transmission having NACK-only feedback. The UE may transmit the sidelink transmission using the resources selected based on the sensing and the inter-UE coordination information if the sidelink transmission is a groupcast transmission having ACK-NACK feedback. The UE may transmit the sidelink transmission using the resources selected based on the inter-UE coordination information if the sidelink transmission is a groupcast transmission having ACK-NACK feedback. The UE may transmit the sidelink transmission using the resources selected based on the sensing information if the sidelink transmission is a groupcast transmission having ACK-NACK feedback.

The criteria observed at the first UE may include at least one of cast type and a type of the inter-UE coordination information. In some aspects, the UE may transmit the sidelink transmission using the resources selected based on the inter-UE coordination information if the sidelink transmission is a unicast transmission to the second UE and the inter-UE coordination information indicates preferred resource information for the second UE. In some aspects, the first UE may transmit the sidelink transmission using the resources selected based at least in part on the inter-UE coordination information indicating non-preferred resource information for the second UE. As an example, the UE may transmit the sidelink transmission using the resources selected based on the inter-UE coordination information if the sidelink transmission is not a unicast transmission to the second UE and the inter-UE coordination information indicates non-preferred resource information for the second UE. The criteria observed at the first UE may include a type of the inter-UE coordination information. The UE may transmit the sidelink transmission using the resources selected based on the sensing if the inter-UE coordination information indicates one or more conflicts. The UE may transmit the sidelink transmission using the resources selected based on the sensing if the inter-UE coordination information indicates a threshold number conflicts. The criteria observed at the first UE may include a timer. The UE may transmit the sidelink transmission using the resources selected based on the sensing during a period of time associated with the timer. The UE may transmit the sidelink transmission using the resources selected based on the inter-UE coordination information during a period of time associated with the timer.

The criteria observed at the first UE may include a priority level of the sidelink transmission. The UE may transmit the sidelink transmission using the resources selected based on the sensing if the sidelink transmission is a lower priority transmission and may transmit the sidelink transmission using the resources selected based on the inter-UE coordination information if the sidelink transmission is a higher priority transmission.

The UE may further receive the indication from the second UE, where the first UE uses the resources selected based on the at least one of the inter-UE coordination information or the sensing based on the indication from the second UE. The indication may instruct the first UE to use one of: the sensing and not the inter-UE coordination information, the inter-UE coordination information and not the sensing, or the inter-UE coordination information and the sensing. The indication may indicate that the second UE will stop sending the inter-UE coordination information, and wherein the first UE uses the sensing in response to receiving the indication. The indication may indicate that the second UE will stop sending the inter-UE coordination information after a period of time. The indication may further indicate the period of time. The period of time following the indication may be defined.

Figure 11:
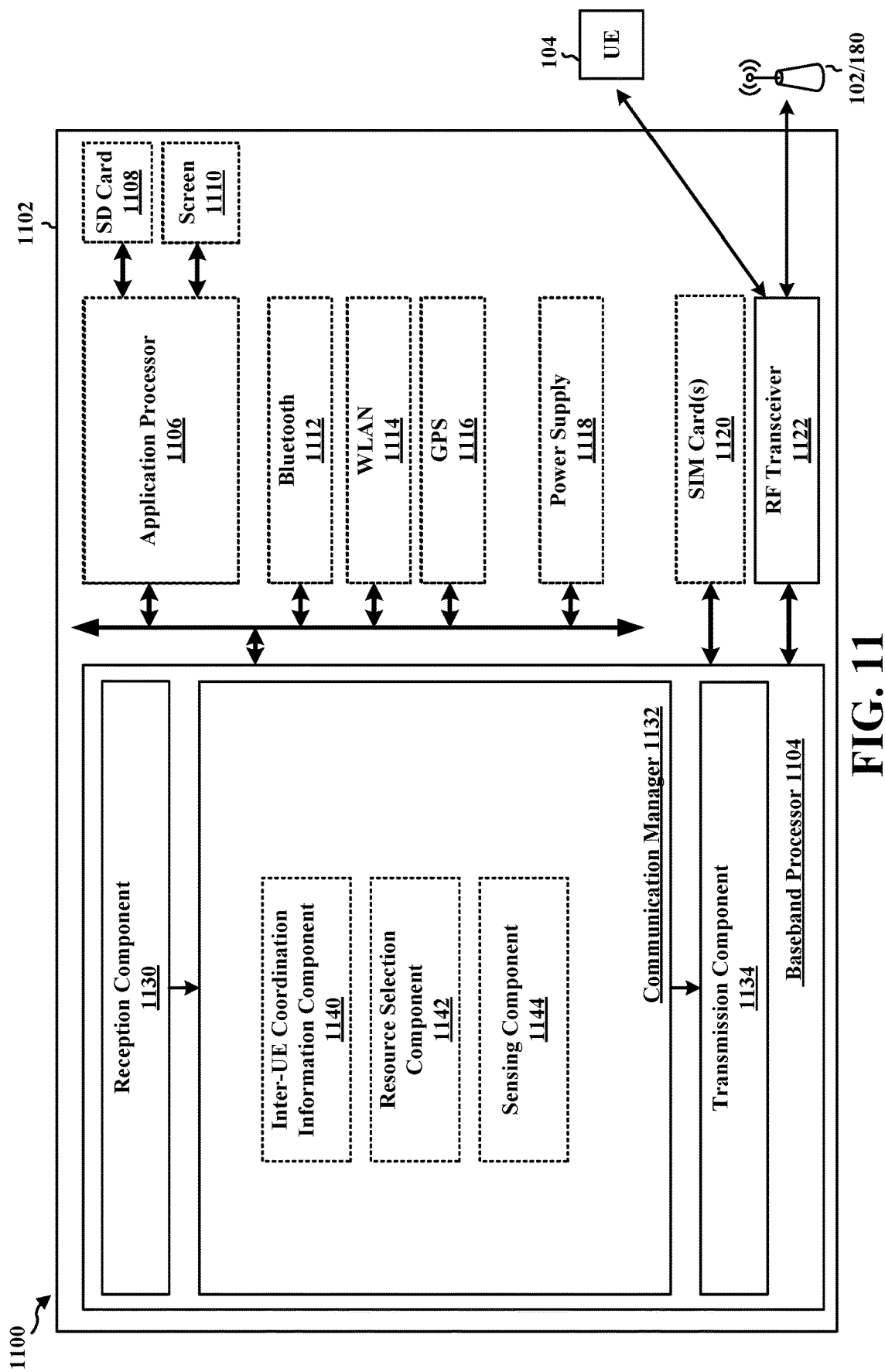
FIG. 11 is a diagram illustrating an example of a hardware implementation for an example apparatus, in accordance with aspects presented herein.

FIG. 11 is a diagram 1100 illustrating an example of a hardware implementation for an apparatus 1102. The apparatus 1102 may be a UE, or another device configured to transmit and/or receive sidelink communication. The apparatus1102 includes a baseband processor 1104 (also referred to as a modem) coupled to a RF transceiver 1122. In some aspects, the baseband processor 1104 may be a cellular baseband processor and/or the RF transceiver 1122 may be a cellular RF transceiver. The apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described in the present application. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an inter-UE coordination information component 1140 that is configured to receive inter-UE coordination information, e.g., as described in connection with 1002 in FIG. 10. The communication manager 1132 further includes a resource selection component 1142 that is configured to select resources for sidelink transmission and to transmit, via the transmission component 1134, the sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE, e.g., as described in connection with 1004 in FIG. 10. The communication manager 1132 further includes a sensing component 1144 that is configured to perform sensing, e.g., as described in connection with 816 in FIG. 8 and/or FIG. 4, 5, or 6.

The apparatus may include additional components that perform each of the blocks of the algorithm in the flowchart of FIG. 10 and/or the aspects performed by the UE-B in FIG. 7 or 8. As such, each block in the flowchart of FIG. 10 and/or the aspects performed by the UE-B in FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for receiving inter-UE coordination information received from a second UE. The apparatus 1102 includes means for transmitting a sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE. The apparatus may further include means for receiving the indication from the second UE, wherein the first UE uses the at least one of the inter-UE coordination information or the sensing based on the indication from the second UE. The UE may further include means for selecting the resources based on at least one of the inter-UE coordination information or the sensing. The means may be one or more of the components of the apparatus 1102 configured to perform the functions recited by the means. As described herein, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
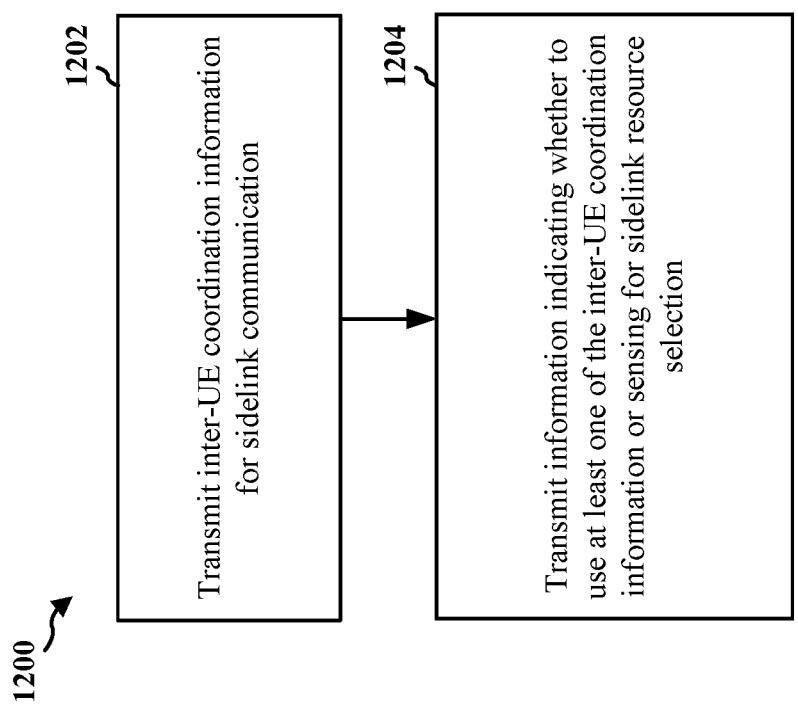
FIG. 12 is a flowchart of a method of wireless communication, in accordance with aspects presented herein.

FIG. 12 is a flowchart 1200 of a method of wireless communication. The method may be performed by a UE (e.g., the UE 104, the UE-A 702 or 802; or the apparatus 1302). The method may improve the use of inter-UE coordination information and/or sensing information for sidelink resource selection by enabling a transmitting UE to indicate to other sidelink UE whether to use inter-UE coordination information.

At 1202, the UE transmits inter-UE coordination information for sidelink communication. The UE may transmit the indication in a sidelink control information-1 (SCI-1), SCI-2, a medium access control-control element (MAC-CE), or sidelink radio resource control (RRC) message, or an inter-UE coordination information message. Example aspects of inter-UE coordination information are described in connection with FIG. 7. FIG. 8 illustrates examples of inter-UE coordination information 818 and 824. The transmission of the inter-UE coordination information may be performed by the inter-UE coordination information component 1340 of the apparatus 1302, e.g., via the transmission component 1334 and/or the transceiver 1322.

At 1204, the UE transmits information indicating whether to use at least one of the inter-UE coordination information or sensing for sidelink resource selection. The indication may instruct the first UE to use one of: the sensing and not the inter-UE coordination information, the inter-UE coordination information and not the sensing, or the inter-UE coordination information and the sensing. The indication may indicate that the second UE will stop sending the inter-UE coordination information, and wherein the first UE uses the sensing in response to receiving the indication. The indication may indicate that the second UE will stop sending the inter-UE coordination information after a period of time. The indication may further indicate the period of time. The period of time following the indication may be defined. The transmission of the indication may be performed by the inter-UE coordination instruction component 1342 of the apparatus 1302, e.g., via the transmission component 1334 and/or the transceiver 1322.

Figure 13:
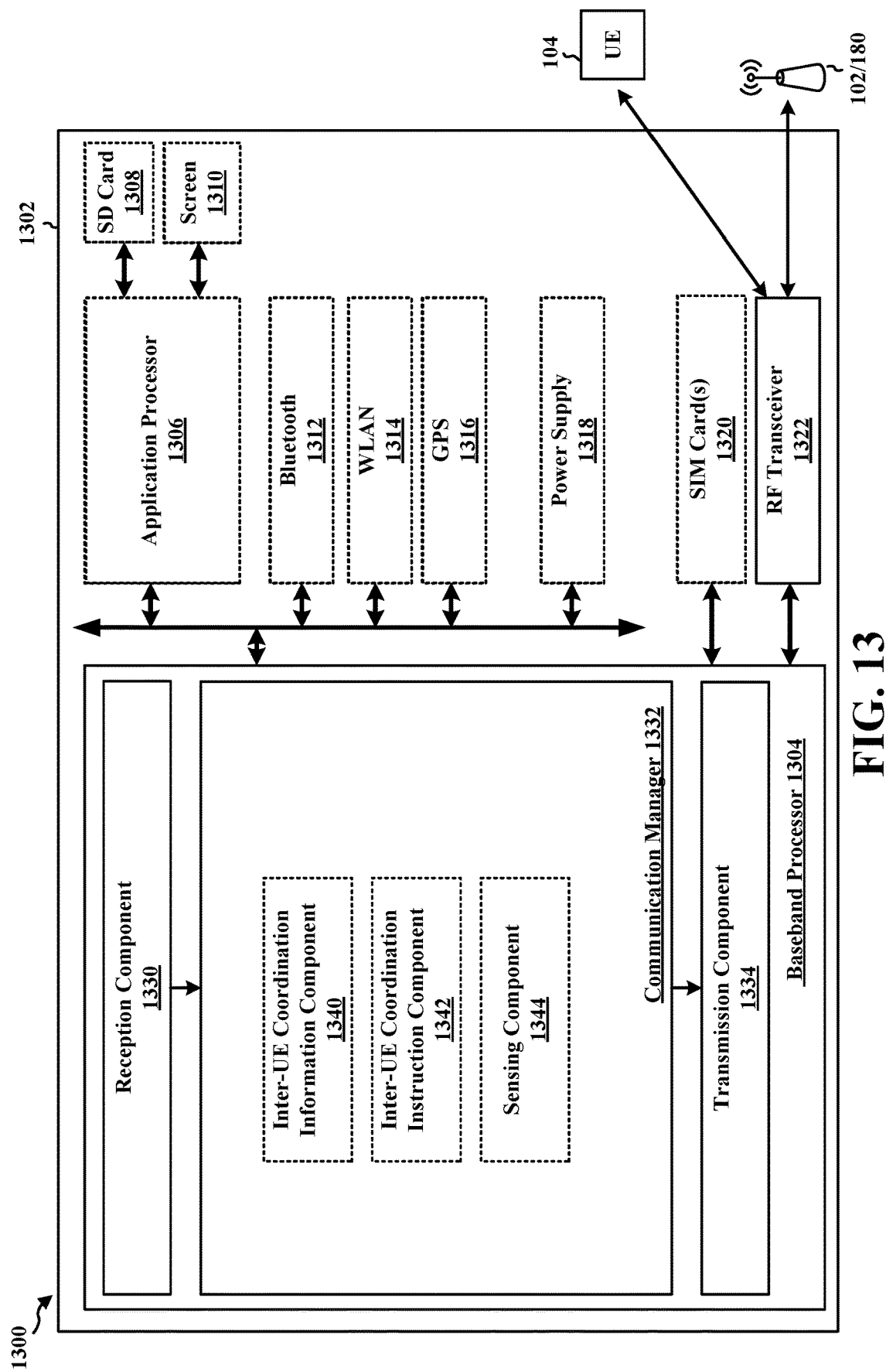
FIG. 13 is a diagram illustrating an example of a hardware implementation for an example apparatus, in accordance with aspects presented herein.

FIG. 13 is a diagram 1300 illustrating an example of a hardware implementation for an apparatus 1302. The apparatus 1302 may be a UE, or another device configured to transmit and/or receive sidelink communication. The apparatus 1302 includes a baseband processor 1304 (also referred to as a modem) coupled to a RF transceiver 1322. In some aspects, the baseband processor 1304 may be a cellular baseband processor and/or the RF transceiver 1322 may be a cellular RF transceiver. The apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described in the present application. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes an inter-UE coordination information component 1340 that is configured to transmit inter-UE coordination information, e.g., as described in connection with 1202 in FIG. 12. The communication manager 1332 further includes an inter-UE coordination instruction component 1342 that is configured to transmit, via the transmission component 1334, information indicating whether to use at least one of the inter-UE coordination information or sensing for sidelink resource selection, e.g., as described in connection with 1204 in FIG. 12. The communication manager 1332 further includes a sensing component 1344 that is configured to perform sensing, e.g., as described in connection with FIG. 4, 5, or 6.

The apparatus may include additional components that perform each of the blocks of the algorithm in the flowchart of FIG. 12 and/or the aspects performed by the UE-A in FIG. 7 or 8. As such, each block in the flowchart of FIG. 12 and/or the aspects performed by the UE-A in FIG. 7 or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for transmitting inter-UE coordination information for sidelink communication. The apparatus 1302 includes means for transmitting information indicating whether to use at least one of the inter-UE coordination information or sensing for sidelink resource selection. The means may be one or more of the components of the apparatus 1302 configured to perform the functions recited by the means. As described herein, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is a method of wireless communication at a first UE, comprising: receiving inter-UE coordination information from a second UE; and transmitting a sidelink transmission using resources selected based on at least one of the inter-UE coordination information or sensing at the first UE, wherein selection of the resources uses the at least one of the inter-UE coordination information or the sensing based on one or more of a criteria observed at the first UE or an indication from the second UE.

In aspect 2, the method of aspect 1 further includes that the first UE uses the resources selected based on at least one of the inter-UE coordination information or the sensing based on the criteria observed at the first UE.

In aspect 3, the method of aspect 2 further includes that the criteria observed at the first UE includes a CBR.

In aspect 4, the method of aspect 3 further includes that the first UE transmits the sidelink transmission using the resources selected based on the sensing and the inter-UE coordination information if the CBR is above a threshold level and transmits the sidelink transmission using the resources selected based on the inter-UE coordination information and not the sensing if the CBR is below the threshold level.

In aspect 5, the method of aspect 3 further includes that the first UE transmits the sidelink transmission using the resources selected based on the sensing and the inter-UE coordination information if the CBR is above a threshold level and transmits the sidelink transmission using the resources selected based on the sensing and not the inter-UE coordination information if the CBR is below the threshold level.

In aspect 6, the method of aspect 3 further includes that the first UE transmits the sidelink transmission using the resources selected based on the inter-UE coordination information if the CBR is above a threshold level and transmits the sidelink transmission using the resources selected based on the sensing and the inter-UE coordination information if the CBR is below the threshold level.

In aspect 7, the method of any of aspects 3-6 further includes that the criteria observed at the first UE includes at least one of a cast type, a feedback option, or a destination for the sidelink transmission.

In aspect 8, the method of aspect 7 further includes that the first UE transmits the sidelink transmission using the resources selected based on the inter-UE coordination information and not the sensing if the sidelink transmission is a unicast transmission to the second UE.

In aspect 9, the method of aspect 7 further includes that the first UE transmits the sidelink transmission using the resources selected based on the sensing and not the inter-UE coordination information if the sidelink transmission is a broadcast transmission.

In aspect 10, the method of aspect 7 further includes that the first UE transmits the sidelink transmission using the resources selected based on the sensing and the inter-UE coordination information if the sidelink transmission is a groupcast transmission.

In aspect 11, the method of aspect 7 further includes that the first UE transmits the sidelink transmission using the resources selected based on the inter-UE coordination information and not the sensing if the sidelink transmission is a groupcast transmission.

In aspect 12, the method of any of aspects 2-11 further includes that the criteria observed at the first UE includes a cast type and a type of the inter-UE coordination information.

In aspect 13, the method of aspect 12 further includes that the first UE transmits the sidelink transmission using the resources selected based on the inter-UE coordination information if the sidelink transmission is a unicast transmission to the second UE and the inter-UE coordination information indicates preferred resource information for the second UE.

In aspect 14, the method of aspect 12 further includes that the first UE transmits the sidelink transmission using the resources selected based on the inter-UE coordination information if the sidelink transmission is not a unicast transmission to the second UE and the inter-UE coordination information indicates non-preferred resource information for the second UE.

In aspect 15, the method of any of aspects 2-14 further includes that the criteria observed at the first UE includes a type of the inter-UE coordination information.

In aspect 16, the method of aspect 15 further includes that the first UE transmits the sidelink transmission using the resources selected based on the sensing if the inter-UE coordination information indicates one or more conflicts.

In aspect 17, the method of aspect 15 further includes that the first UE transmits the sidelink transmission using the resources selected based on the sensing if the inter-UE coordination information indicates a threshold number conflicts.

In aspect 18, the method of aspect 15 further includes that the first UE transmits the sidelink transmission using the resources selected based at least in part on the inter-UE coordination information indicating non-preferred resource information for the second UE.

In aspect 19, the method of any of aspects 2-18 further includes that the criteria observed at the first UE includes a timer.

In aspect 20, the method of aspect 19 further includes that the first UE transmits the sidelink transmission using the resources selected based on the sensing during a period of time associated with the timer.

In aspect 21, the method of aspect 19 further includes that the first UE transmits the sidelink transmission using the resources selected based on the inter-UE coordination information during a period of time associated with the timer.

In aspect 22, the method of any of aspects 2-21 further includes that the criteria observed at the first UE includes a priority level of the sidelink transmission.

In aspect 23, the method of aspect 22 further includes that the first UE transmits the sidelink transmission using the resources selected based on the sensing if the sidelink transmission is a lower priority transmission and transmits the sidelink transmission using the resources selected based on the inter-UE coordination information if the sidelink transmission is a higher priority transmission.

In aspect 24, the method of aspect 1 further includes receiving the indication from the second UE, wherein the first UE uses the resources selected based on at least one of the inter-UE coordination information or the sensing based on the indication from the second UE.

In aspect 25, the method of aspect 24 further includes that the indication instructs the first UE to use one of: the sensing and not the inter-UE coordination information, the inter-UE coordination information and not the sensing, or the inter-UE coordination information and the sensing.

In aspect 26, the method of aspect 24 or aspect 25 further includes that the indication indicates that the second UE will stop sending the inter-UE coordination information, and wherein the first UE uses the resources selected based on the sensing in response to receiving the indication.

In aspect 27, the method of any of aspects 24-26 further includes that the indication indicates that the second UE will stop sending the inter-UE coordination information after a period of time.

In aspect 28, the method of aspect 27 further includes that the indication further indicates the period of time.

In aspect 29, the method of aspect 27 further includes that the period of time following the indication is defined.

In aspect 30, the method of any of aspects 23-29 further includes that the first UE receives the indication in a SCI-1, SCI-2, a MAC-CE, or sidelink RRC message, or an inter-UE coordination information message.

Aspect 31 is a method of wireless communication at a UE, comprising: transmitting inter-UE coordination information for sidelink communication; and transmitting information indicating whether to use at least one of the inter-UE coordination information or sensing for sidelink resource selection.

In aspect 32, the method of aspect 31 further includes that the information indicates for the sidelink resource selection to be based on one of: the sensing and not the inter-UE coordination information, the inter-UE coordination information and not the sensing, or the inter-UE coordination information and the sensing.

In aspect 33, the method of aspect 31 or 32 further includes that the information indicates that the UE will stop sending the inter-UE coordination information.

In aspect 34, the method of aspect 33 further includes that the information indicates that the UE will stop sending the inter-UE coordination information after a period of time.

In aspect 35, the method of aspect 34 further includes that the information further indicates the period of time.

In aspect 36, the method of aspect 34 further includes that the period of time following transmission of the information is defined.

In aspect 37, the method of any of aspects 31-37 further includes that the UE transmits the information in a SCI-1, SCI-2, a MAC-CE, or sidelink RRC message, or an inter-UE coordination information message.

Aspect 38 is an apparatus for wireless communication at a first UE, comprising: at least one processor; and at least one memory communicatively coupled with the at least one processor and storing processor-readable code that, when executed by the at least one processor, is configured to cause the first UE to perform the method of any of aspects 1-30.

In aspect 39, the apparatus of aspect 38 further includes a transceiver coupled to the at least one processor.

In aspect 40, the apparatus of aspect 38 or 39 further includes at least one antenna coupled to the at least one processor.

Aspect 41 is an apparatus for wireless communication at a first UE, comprising means to perform the method of any of aspects 1-30.

In aspect 42, the apparatus of aspect 41 further includes a transceiver.

In aspect 43, the apparatus of aspect 41 or 42 further includes at least one antenna.

Aspect 44 is a non-transitory computer-readable medium storing computer executable code at a UE, the code when executed by a processor causes the processor to perform the method of any of aspects 1-30.

Aspect 45 is an apparatus for wireless communication at a UE, comprising: at least one processor; and at least one memory communicatively coupled with the at least one processor and storing processor-readable code that, when executed by the at least one processor, is configured to cause the first UE to perform the method of any of aspects 31-37.

In aspect 46, the apparatus of aspect 45 further includes a transceiver coupled to the at least one processor.

In aspect 47, the apparatus of aspect 45 or 46 further includes at least one antenna coupled to the at least one processor.

Aspect 48 is an apparatus for wireless communication at a UE, comprising means to perform the method of any of aspects 31-37.

In aspect 49, the apparatus of aspect 48 further includes a transceiver.

In aspect 50, the apparatus of aspect 48 or 49 further includes at least one antenna.

Aspect 51 is a non-transitory computer-readable medium storing computer executable code at a UE, the code when executed by a processor causes the processor to perform the method of any of aspects 31-37.

What is claimed is:

1. A method of wireless communication at a first user equipment (UE), comprising:
    receiving inter-UE coordination information from a second UE; and
    transmitting a sidelink transmission using resources selected based on at least one of the inter-UE coordination information or sensing at the first UE, wherein the first UE uses the at least one of the inter-UE coordination information or the sensing based on criteria observed at the first UE, and wherein the first UE transmits the sidelink transmission using the resources selected based on the inter-UE coordination information if the sidelink transmission is a unicast transmission to the second UE and the inter-UE coordination information indicates preferred resource information for the second UE.

2. The method of claim 1, wherein the criteria observed at the first UE further includes at least one of a feedback option, or a destination for the sidelink transmission.

3. The method of claim 1, wherein the first UE transmits the sidelink transmission using the resources selected based on the inter-UE coordination information and not the sensing if the sidelink transmission is a groupcast transmission.

4. The method of claim 1, wherein the criteria observed at the first UE further includes a timer.

5. A method of wireless communication at a first user equipment (UE), comprising:
    receiving inter-UE coordination information from a second UE, wherein a type of the inter-UE coordination information includes one or more of a preferred resource type of inter-UE coordination information, a non-preferred resource type of inter-UE coordination information, or a conflict type of inter-UE coordination information; and
    transmitting a sidelink transmission using resources selected based on at least one of the inter-UE coordination information or sensing at the first UE,
    wherein the first UE uses the at least one of the inter-UE coordination information or the sensing based on criteria observed at the first UE, and
    wherein the first UE transmits the sidelink transmission using the resources selected based at least in part on the inter-UE coordination information based on the criteria that the type of the inter-UE coordination information indicates non-preferred resource information for the second UE.

6. A method of wireless communication at a first user equipment (UE), comprising:
    receiving inter-UE coordination information from a second UE; and
    transmitting a sidelink transmission using resources selected based on at least one of the inter-UE coordination information or sensing at the first UE, wherein selection of the resources uses the at least one of the inter-UE coordination information or the sensing based on a criteria observed at the first UE and a type of the inter-UE coordination information, wherein the first UE transmits the sidelink transmission using the resources selected using the sensing based on the criteria that the inter-UE coordination information indicates a threshold number of conflicts.

7. A method of wireless communication at a first user equipment (UE), comprising:
receiving inter-UE coordination information from a second UE; and
transmitting a sidelink transmission using resources selected based on at least one of the inter-UE coordination information or sensing at the first UE, wherein the first UE uses the at least one of the inter-UE coordination information or the sensing based on a criteria observed at the first UE, wherein the criteria observed at the first UE includes at least one of a cast type, a feedback option, or a destination for the sidelink transmission, and wherein:
the first UE transmits the sidelink transmission using the resources selected based on the inter-UE coordination information and not the sensing if the sidelink transmission is a unicast transmission to the second UE,
the first UE transmits the sidelink transmission using the resources selected based on the sensing and not the inter-UE coordination information if the sidelink transmission is a broadcast transmission, and
the first UE transmits the sidelink transmission using the resources selected based on the sensing and the inter-UE coordination information if the sidelink transmission is a groupcast transmission.

8. A method of wireless communication at a first user equipment (UE), comprising:
receiving inter-UE coordination information from a second UE; and
transmitting a sidelink transmission using resources selected based on at least one of the inter-UE coordination information or sensing at the first UE, wherein the first UE uses the at least one of the inter-UE coordination information or the sensing based on a criteria observed at the first UE, wherein the criteria observed at the first UE includes a channel busy ratio (CBR), and wherein:
the first UE transmits the sidelink transmission using the resources selected based on the sensing and the inter-UE coordination information if the CBR is above a threshold level and transmits the sidelink transmission using the inter-UE coordination information and not the sensing if the CBR is below the threshold level,
the first UE transmits the sidelink transmission using the resources selected based on the sensing and the inter-UE coordination information if the CBR is above the threshold level and transmits the sidelink transmission using the sensing and not the inter-UE coordination information if the CBR is below the threshold level, or
the first UE transmits the sidelink transmission using the resources selected based on the inter-UE coordination information if the CBR is above the threshold level and transmits the sidelink transmission using the sensing and the inter-UE coordination information if the CBR is below the threshold level.

9. A method of wireless communication at a first user equipment (UE), comprising:
receiving inter-UE coordination information from a second UE; and
transmitting a sidelink transmission using resources selected based on at least one of the inter-UE coordination information or sensing at the first UE, wherein the first UE determines, based on a criteria observed at the first UE, whether to use the at least one of the inter-UE coordination information or the sensing for resource selection for the sidelink transmission, wherein the criteria observed at the first UE includes a priority level of the sidelink transmission, and wherein transmitting the sidelink transmission includes:
transmitting the sidelink transmission using the resources selected based on the sensing if the sidelink transmission is a lower priority transmission; and
transmitting transmits the sidelink transmission using the resources selected based on the inter-UE coordination information if the sidelink transmission is a higher priority transmission.

10. The method of claim 9, wherein the criteria observed at the first UE further includes a type of the inter-UE coordination information.

11. The method of claim 9, wherein the criteria observed at the first UE further includes a cast type.

12. A method of wireless communication at a first user equipment (UE), comprising:
receiving inter-UE coordination information from a second UE;
receiving, in addition to the inter-UE coordination information, an indication from the second UE, wherein the indication instructs the first UE to use one of:
sensing and not the inter-UE coordination information,
the inter-UE coordination information and not the sensing, or
the inter-UE coordination information and the sensing; and
transmitting a sidelink transmission, wherein based on the indication from the second UE, selection of resources to transmit the sidelink transmission is based on one of:
the sensing and not the inter-UE coordination information,
the inter-UE coordination information and not the sensing, or
the inter-UE coordination information and the sensing.

13. An apparatus for wireless communication at a first user equipment (UE), comprising:
memory; and
at least one processor coupled to the memory and configured to:
receive inter-UE coordination information from a second UE; and
transmit a sidelink transmission using resources selected based on at least one of the inter-UE coordination information or sensing at the first UE, wherein the first UE uses the at least one of the inter-UE coordination information or the sensing based on a criteria observed at the first UE, and wherein the at least one processor is configured to transmit the sidelink transmission using the resources selected based on the inter-UE coordination information if the sidelink transmission is a unicast transmission to the second UE and the inter-UE coordination information indicates preferred resource information for the second UE.

14. The apparatus of claim 13, further comprising:
at least one transceiver coupled to the at least one processor, wherein the criteria observed at the first UE further includes at least one of a feedback option, or a destination for the sidelink transmission.

15. The apparatus of claim 13, wherein the at least one processor is configured to transmit the sidelink transmission using the resources selected based on the inter-UE coordination information and not the sensing if the sidelink transmission is a groupcast transmission.

16. The apparatus of claim 13, wherein the criteria observed at the first UE further includes a timer.

17. An apparatus for wireless communication at a first user equipment (UE), comprising:
memory; and
at least one processor coupled to the memory and configured to;
receive inter-UE coordination information from a second UE, wherein a type of the inter-UE coordination information includes one or more of a preferred resource type of inter-UE coordination information, a non-preferred resource type of inter-UE coordination information, or a conflict type of inter-UE coordination information; and
transmit a sidelink transmission using resources selected based on at least one of the inter-UE coordination information or sensing at the first UE,
wherein use of the at least one of the inter-UE coordination information or the sensing is based on criteria observed at the first UE, and
wherein the sidelink transmission has the resources selected with use of the inter-UE coordination information based on the criteria that the inter-UE coordination information indicates non-preferred resource information for the second UE.

18. An apparatus for wireless communication at a first user equipment (UE), comprising:
memory; and
at least one processor coupled to the memory and configured to:
receive inter-UE coordination information from a second UE; and
transmit a sidelink transmission using resources selected based on at least one of the inter-UE coordination information or sensing at the first UE, wherein selection of the resources uses the at least one of the inter-UE coordination information or the sensing based on a criteria observed at the first UE and a type of the inter-UE coordination information, and wherein the at least one processor is configured to transmit the sidelink transmission using the resources selected with use of the sensing based on the criteria that the inter-UE coordination information indicates a threshold number of conflicts.

19. An apparatus for wireless communication at a first user equipment (UE), comprising:
memory; and
at least one processor coupled to the memory and configured to:
receive inter-UE coordination information from a second UE; and
transmit a sidelink transmission using resources selected based on at least one of the inter-UE coordination information or sensing at the first UE, wherein the first UE uses the at least one of the inter-UE coordination information or the sensing based on a criteria observed at the first UE, wherein the criteria observed at the first UE includes at least one of a cast type, a feedback option, or a destination for the sidelink transmission, and wherein the at least one processor is configured to:
transmit the sidelink transmission using the resources selected based on the inter-UE coordination information and not the sensing if the sidelink transmission is a unicast transmission to the second UE,
transmit the sidelink transmission using the resources selected based on the sensing and not the inter-UE coordination information if the sidelink transmission is a broadcast transmission, and
transmit the sidelink transmission using the resources selected based on the sensing and the inter-UE coordination information if the sidelink transmission is a groupcast transmission.

20. An apparatus for wireless communication at a first user equipment (UE), comprising:
memory; and
at least one processor coupled to the memory and configured to:
receive inter-UE coordination information from a second UE; and
transmit a sidelink transmission using resources selected based on at least one of the inter-UE coordination information or sensing at the first UE, wherein the first UE uses the at least one of the inter-UE coordination information or the sensing based on a criteria observed at the first UE, wherein the criteria observed at the first UE includes a channel busy ratio (CBR), and wherein the at least one processor is configured to:
transmit the sidelink transmission using the resources selected based on the sensing and the inter-UE coordination information if the CBR is above a threshold level and transmit the sidelink transmission using the resources selected based on the inter-UE coordination information and not the sensing if the CBR is below the threshold level,
transmit the sidelink transmission using the resources selected based on the sensing and the inter-UE coordination information if the CBR is above the threshold level and transmit the sidelink transmission using the resources selected based on the sensing and not the inter-UE coordination information if the CBR is below the threshold level, or
transmit the sidelink transmission using the resources selected based on the inter-UE coordination information if the CBR is above the threshold level and transmit the sidelink transmission using the resources selected based on the sensing and the inter-UE coordination information if the CBR is below the threshold level.

21. An apparatus for wireless communication at a first user equipment (UE), comprising:
memory; and
at least one processor coupled to the memory and configured to:
receive inter-UE coordination information from a second UE; and
transmit a sidelink transmission using resources selected based on at least one of the inter-UE coordination information or sensing at the first UE, wherein the first UE uses the at least one of the inter-UE coordination information or the sensing based on a criteria observed at the first UE, wherein the criteria observed at the first UE includes a priority level of the sidelink transmission, and wherein the at least one processor is configured to:
transmit the sidelink transmission using the resources selected based on the sensing if the sidelink transmission is a lower priority transmission, and
transmit the sidelink transmission using the resources selected based on the inter-UE coordination information if the sidelink transmission is a higher priority transmission.

22. The apparatus of claim 21, wherein the criteria observed at the first UE further includes a type of the inter-UE coordination information.

23. The apparatus of claim 22, wherein the criteria observed at the first UE further includes a cast type.

24. An apparatus for wireless communication at a first user equipment (UE), comprising:
- memory; and
- at least one processor coupled to the memory and configured to:
  - receive inter-UE coordination information from a second UE;
  - receive, in addition to the inter-UE coordination information, an indication from the second UE wherein the indication instructs the first UE to use one of:
    - sensing and not the inter-UE coordination information,
    - the inter-UE coordination information and not the sensing, or
    - the inter-UE coordination information and the sensing; and
  - transmit a sidelink transmission, wherein based on the indication from the second UE, selection of resources to transmit the sidelink transmission is based on one of:
    - the sensing and not the inter-UE coordination information,
    - the inter-UE coordination information and not the sensing, or
    - the inter-UE coordination information and the sensing.

25. An apparatus for wireless communication at a second user equipment (UE), comprising:
- memory; and
- at least one processor coupled to the memory and configured to:
  - transmit, to a first UE, inter-UE coordination information for sidelink communication; and
  - transmit, to the first UE, additional information instructing the first UE whether to use at least one of the inter-UE coordination information or sensing for sidelink resource selection, wherein the additional information indicates for the sidelink resource selection of the second UE to be based on one of:
- the sensing and not the inter-UE coordination information,
- the inter-UE coordination information and not the sensing, or
- the inter-UE coordination information and the sensing.

* * * * *